US011405658B2

United States Patent
Masterson

(10) Patent No.: US 11,405,658 B2
(45) Date of Patent: Aug. 2, 2022

(54) SYSTEM AND PROCESS FOR PROVIDING AUTOMATED PRODUCTION OF MULTI-CHANNEL LIVE STREAMING VIDEO FEEDS

(71) Applicant: GAJ HOLDING, Boca Raton, FL (US)

(72) Inventor: Taun Masterson, Boca Raton, FL (US)

(73) Assignee: AUTOVIDPROD LLC, Boca Raton, FL (US)

( * ) Notice: Subject to any disclaimer, the term of this patent is extended or adjusted under 35 U.S.C. 154(b) by 153 days.

(21) Appl. No.: 15/506,272

(22) PCT Filed: Aug. 24, 2015

(86) PCT No.: PCT/US2015/046571
§ 371 (c)(1),
(2) Date: Feb. 24, 2017

(87) PCT Pub. No.: WO2016/032968
PCT Pub. Date: Mar. 3, 2016

(65) Prior Publication Data
US 2017/0244985 A1    Aug. 24, 2017

Related U.S. Application Data

(60) Provisional application No. 62/041,096, filed on Aug. 24, 2014.

(51) Int. Cl.
*H04N 21/2187* (2011.01)
*H04N 21/218* (2011.01)
(Continued)

(52) U.S. Cl.
CPC ... *H04N 21/2187* (2013.01); *H04N 21/21805* (2013.01); *H04N 21/23418* (2013.01);
(Continued)

(58) Field of Classification Search
CPC ............... H04N 7/181; H04N 21/4223; H04N 21/21805; H04N 21/2187;
(Continued)

(56) References Cited

U.S. PATENT DOCUMENTS 8,612,517 B1 * 12/2013 Yadid ............... H04N 21/25891
709/201
9,635,400 B1 * 4/2017 Sherrets ................ H04N 21/25
(Continued)

OTHER PUBLICATIONS

Extended European Search Report issued in European Patent Application No. 15835689.9, dated Feb. 21, 2018, pp. 1-8.
(Continued)

*Primary Examiner* — Jason Salce
(74) *Attorney, Agent, or Firm* — Jeffrey S. Melcher; Melcher Patent Law PLLC

(57) ABSTRACT

Provided is an automated system and process for producing a live video stream from a plurality live video feeds of an event from different views utilizing a transponder that measures a variable property of a person or animal participating in the event or a device that moves in the event, or the computer determines the measurement of the variable property utilizing pixels from the live video feeds. The computer 150 automatically selects a live video stream to broadcast from the plurality of live video stream to a user interface 120 based on the measurement.

20 Claims, 9 Drawing Sheets

(51) Int. Cl.
   *H04N 21/234*  (2011.01)
   *H04N 21/422*  (2011.01)
   *H04N 21/4223* (2011.01)
   *H04N 21/482*  (2011.01)
(52) U.S. Cl.
   CPC ... *H04N 21/4223* (2013.01); *H04N 21/42201* (2013.01); *H04N 21/482* (2013.01)
(58) Field of Classification Search
   CPC .... H04N 21/23418; H04N 5/247; H04N 5/77; H04N 5/23206; H04N 21/2743; H04N 21/854
   See application file for complete search history.

(56) References Cited

U.S. PATENT DOCUMENTS

| | | | |
|---|---|---|---|
| 2002/0090217 A1* | 7/2002 | Limor | H04N 5/222 396/429 |
| 2006/0038818 A1 | 2/2006 | Steele | |
| 2007/0143493 A1* | 6/2007 | Mullig | H04L 29/06027 709/232 |
| 2009/0144785 A1* | 6/2009 | Walker | G11B 27/034 725/105 |
| 2010/0026809 A1 | 2/2010 | Curry | |
| 2010/0123830 A1* | 5/2010 | Vunic | G06K 9/00711 348/700 |
| 2011/0013087 A1* | 1/2011 | House | A63B 24/0021 348/564 |
| 2011/0069229 A1 | 3/2011 | Lord | |
| 2012/0059826 A1* | 3/2012 | Mate | G06F 17/30843 707/737 |
| 2013/0204930 A1 | 8/2013 | Hobby | |
| 2013/0332603 A1 | 12/2013 | Hutten | |
| 2014/0064693 A1* | 3/2014 | Deshpande | H04N 9/8205 386/230 |
| 2014/0094302 A1 | 4/2014 | Wilkiewicz | |
| 2015/0128174 A1* | 5/2015 | Rango | H04N 21/21805 725/34 |
| 2015/0142429 A1* | 5/2015 | Ondeck | G10L 19/00 704/231 |
| 2015/0227513 A1* | 8/2015 | Sathish | H04N 21/858 707/769 |
| 2016/0100110 A1* | 4/2016 | Mate | G06K 9/00624 348/218.1 |

OTHER PUBLICATIONS

International Search Report issued in PCT/US2015/46571, dated Jan. 11, 2016, pp. 1-3.
Response and Amendment filed in European Patent Application No. 15835689.9, dated Sep. 2018, pp. 1-8.
Communication issued in European Patent Application No. 15835689.9, dated Jun. 17, 2019, pp. 1-8.
Soloshot camera, www.soloshot.com, pp. 1-7.

* cited by examiner

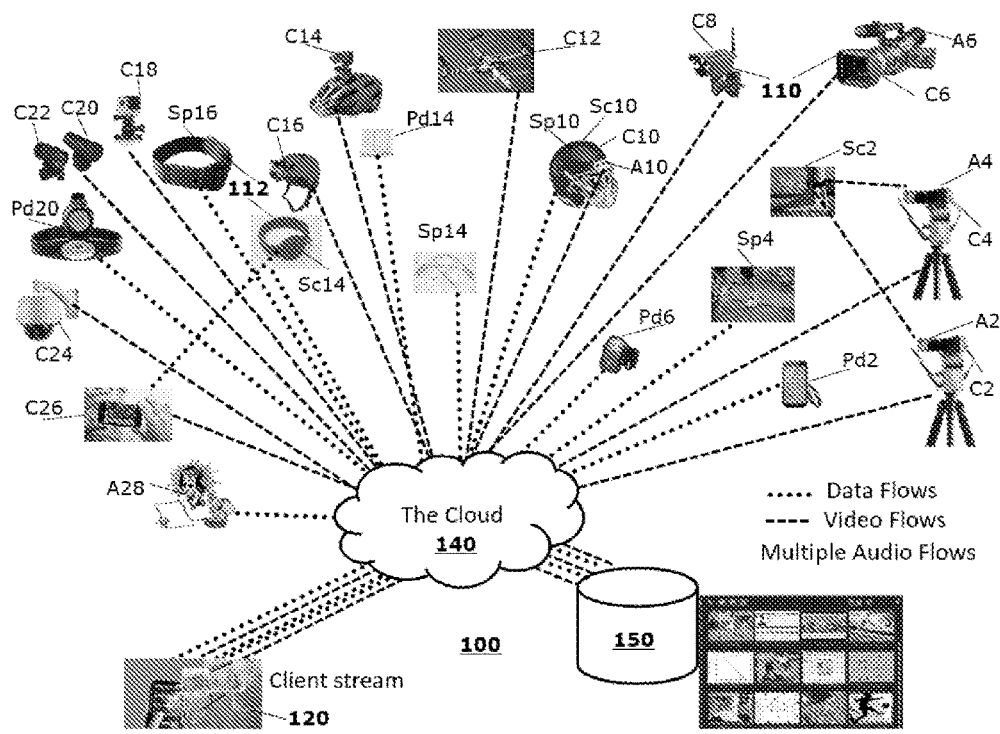

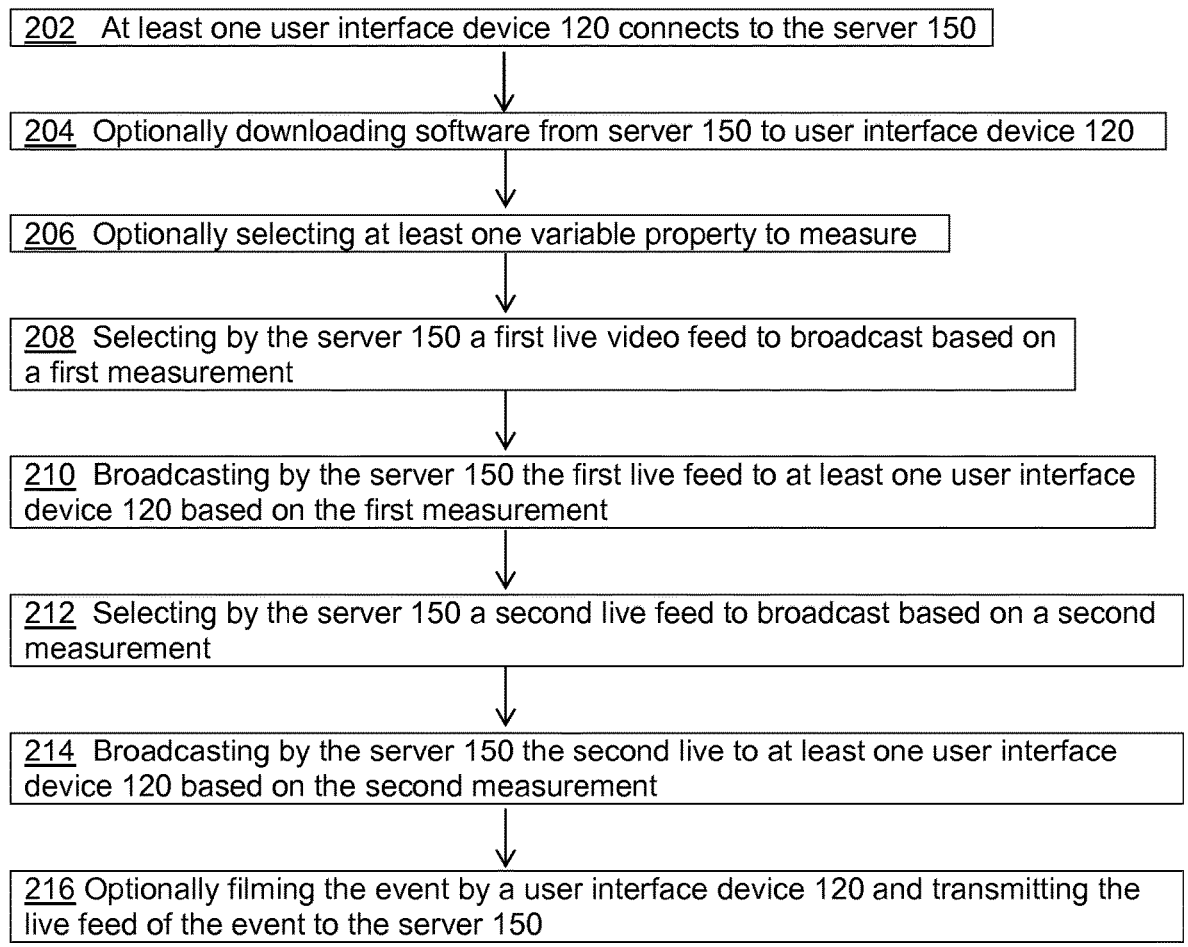

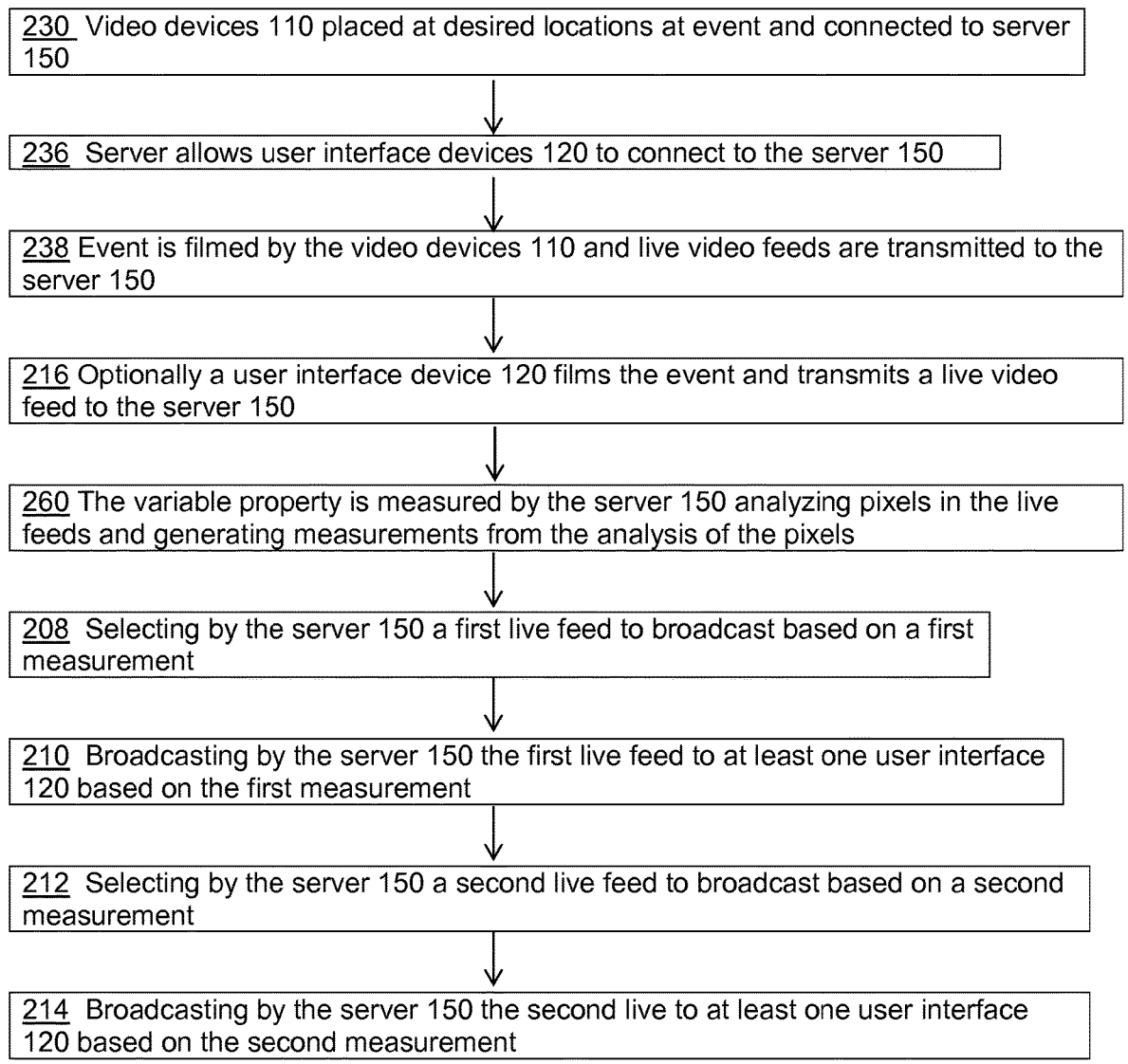

SYSTEM AND PROCESS FOR PROVIDING AUTOMATED PRODUCTION OF MULTI-CHANNEL LIVE STREAMING VIDEO FEEDS

This application claims priority to U.S. Provisional Patent Application Ser. No. 62/041,096, filed 24 Aug. 2014.

FIELD OF THE INVENTION

The invention relates to an automated system and process for producing a live video stream from a plurality live video feeds of an event from different views utilizing a transponder that measures a variable property of a person or animal participating in the event or a device that is associated with the event.

BACKGROUND OF THE INVENTION

Online streaming video via the web has been expanding rapidly. A proliferation of high quality video cameras has changed the dynamics of streaming video to include live video feeds from mobile phone devices, mini camera devices, cameras embedded in a wide range of devices and equipment, dedicated surveillance cameras as well as professional grade cameras, utilizing wifi connections and cellular uploads.

Many sports events, conferences, corporate events, military operations and dedicated monitoring cameras provide online video feeds. These video feeds either provide raw unedited streaming video or require a behind the scenes dedicated editing and production staff.

The majority of filmed events cannot afford a production staff to handle the multiple live video feeds. Thus, there is a need for an automated system and process for producing a live video stream from a plurality of live video feeds.

SUMMARY OF THE INVENTION

An objective of the invention is to provide an automated system and process for producing a live video stream from a plurality of live video feeds filming a live event that does not require a production staff. The event can be for example, without being limited thereto, any sporting event such as baseball, soccer, football, tennis, race, bicycling, race cars, motorcycle race, motocross, surfing, skydiving, skiing, waterskiing, boating, golfing, or any other sport, military engagement, concert, show, reality show, or other activity that will be filmed from a plurality of angles The amount of high quality video devices in use are increasing rapidly with mobile phones, motor vehicles, drones, SLR cameras and surveillance camera's now providing high definition video. As these devices incorporate more real-time streaming capabilities through improved wifi, improved compression algorithms and increase bandwidth, it will be possible to create a "live mesh" of connected cameras within the boundaries of an event, meaning that numerous additional sources of streaming video feeds can be incorporated into the live stream available for automated editing and production.

RFID, 3D GPS, near field communication, blue tooth, and wifi technologies continue to progress and a proliferation of devices including mobile phones, watches and sports equipment incorporate sensor and transmitter devices. Many of these tags are providing data such as location, elevation, speed, distance, heart rate and nutrition levels, in a live stream format which are useful on their own but increase the contextual value of live streaming video when incorporated into the live stream according to the present invention.

By incorporating multiple sensor data sources from transponders along with multiple sources of streaming video the measurements from the transponders, and digital video analysis, can be analyzed according to a range of algorithms that can be fine-tuned for individual sports events and other specific events in order to automatically select which camera and data feeds to display in a primary live video stream to the user. By automating the selection and production of a primary video stream along with accompanying audio streams, one can avoid the need for expensive camera, editing and production crews.

Individuals watching the live streamed event can have access not only to the wide range of sensor data available but will also be able to set their preference criteria and parameters allowing them to view and receive real time video streams according to those constraints and view the event real time from the perspective of the cameras in the mesh that meet their settings.

The inventor has built an exemplary prototype of the system and process for providing automated production of multi-channel streaming video feeds which is illustrated in the submitted drawings, which can be expanded to be offered on commercially available mobile streaming sites.

The objectives of the invention can be provided by a process for providing automated live video stream production of an event comprising:

connecting a plurality of video devices to a cloud-based server via a network, the video devices comprising a camera and transmitter for transmitting live video feeds to the server, the video devices being aimed at different views of the event;

connecting at least one transponder to a person or animal participating in the event or device being used in the event for live measuring of at least one variable property of the person, animal or device that changes during the event;

transmitting by the video devices a plurality of the live video feeds of the different views of the event to the server;

transmitting by the at least one transponder a measurement feed of measurements of the at least one variable property during the event to the server;

selecting by the server one of the live video feeds based on the measurement of the at least one variable property at a first time;

connecting by a user a user interface device to the server, the user interface having a display constructed to display video;

broadcasting by the server a first selected live video feed to the user interface device, the first selected live video feed being selected by the server based on the measurement at the first time;

the user interface device displaying the first selected live video feed;

broadcasting by the server a second selected live video feed to the user interface device and stopping broadcasting of the first live video feed, the second selected live video feed being selected by the server based on the measurement at a second time later than the first time, the second selected live feed having a different view of the event than the first selected live feed; and the user interface device displaying the second selected live feed.

The objectives of the invention can also be obtained by a computer readable medium storing instructions executable by a computing system in non-volatile memory, wherein execution of the instructions implements the process for providing automated live video stream production of an event.

The objectives of the invention can further be met by a system for automatically producing a live video stream according to the process for providing automated live video stream production of an event comprising:

the cloud-based server connected to the internet;

the plurality of the video devices connected to a cloud-based server via a network;

the plurality of the user interface devices connected to the server;

the at least one transponder connected to the person, animal or device; and a video stream selection software module constructed to select the live video stream to be broadcast based on the measurement.

BRIEF DESCRIPTION OF THE DRAWINGS

FIG. 1 illustrates an example of the integration of a range of video and audio sources and data transmission devices into a value enhanced video stream accessible via the internet.

FIG. 2 is an illustration of the automated edit switching between multiple video, audio and data sources.

FIGS. 3A-C illustrate flow chart of examples of the invention.

DETAILED DESCRIPTION OF THE INVENTION

Figure 3B:
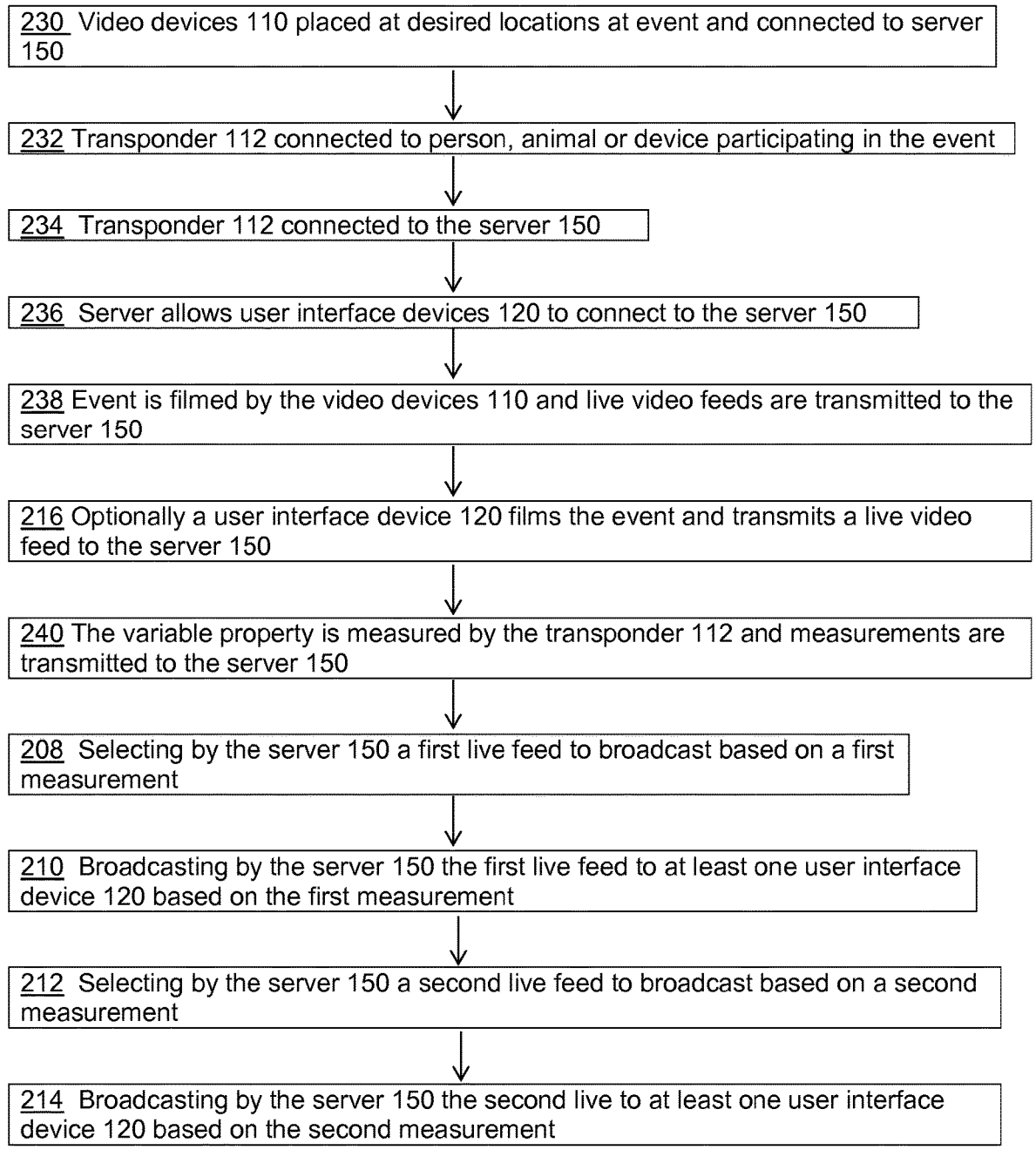

In the following description, for purposes of explanation and not limitation, specific details are set forth, such as particular networks, communication systems, computers, terminals, devices, components, techniques, storage devices, data and network protocols, software products and systems, operating systems, development interfaces, hardware, etc. in order to provide a thorough understanding of the present invention. However, it will be apparent to one skilled in the art that the present invention may be practiced in other embodiments that depart from these specific details. Detailed descriptions of well-known networks, computers, digital devices, storage devices, components, techniques, data and network protocols, software products and systems, development interfaces, operating systems, and hardware are omitted so as not to obscure the description of the present invention.

The invention will now be explained with reference to the attached non-limiting FIGS. The operations described in FIGS. and herein can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

FIGS. 1 and 2 describe an example of an automated live video production system 100. The system 100 comprises a plurality of video devices 110 for providing the live video feeds of the event from different views, at least one transponder 112, a main server 150, and a user interface device 120 for viewing the video stream produced by the main server 150, all interconnected via a communication network 140. All interconnections between the video devices 110, transponders 112, user interface devices 120 and server 150 can be direct, indirect, wireless and/or wired as desired.

Various networks 140 may be implemented in accordance with embodiments of the invention, including a wired or wireless local area network (LAN) and a wide area network (WAN), wireless personal area network (PAN) and other types of networks that comprise or are connected to the Internet. When used in a LAN networking environment, computers may be connected to the LAN through a network interface or adapter. When used in a WAN networking environment, computers typically include a modem, router, switch, or other communication mechanism. Modems may be internal or external, and may be connected to the system bus via the user-input interface, or other appropriate mechanism. Computers may be connected over the Internet, an Intranet, Extranet, Ethernet, or any other system that provides communications, such as by the network 140. Some suitable communications protocols may include TCP/IP, UDP, OSI, Ethernet, WAP, IEEE 802.11, Bluetooth, Zigbee, IrDa, WebRTC, or any other desired protocol. Furthermore, components of the system may communicate through a combination of wired or wireless paths, including the telephone networks.

The system 100 can be accessed via any user interface device 120 that is capable of connecting to the main server 150 via the internet. A plurality of user interface devices 120 can be connected to the server. An exemplary user interface device 120 contains a web browser and display. This includes user interface devices 120 such as internet connected televisions and projectors, tablets, iPads, Mac OS computers, Windows computers, e-readers, and mobile user devices such as the smartphones, iPhone, Android, and Windows Phone, and other communication devices. Preferably, the user interface device 120 is a television, tablet or smartphone. The smartphone can be in any form, such as a hand held device, wristband, or part of another device, such as vehicle. The user interface devices 120 can connect to the server 150 via the internet and/or wirelessly, such as through a mobile telephone network 140, and/or any other suitable medium. The user interface device 120 preferably includes an I/O interface that allows a user to interact with the system 100. The I/O interface may include any hardware, software, or combination of hardware and software.

The computer processing unit (CPU) of the user interface device 120 can be implemented as a conventional microprocessor, application specific integrated circuit (ASIC), digital signal processor (DSP), programmable gate array (PGA), or the like. The CPU executes the instructions that are stored in order to process data. The set of instructions may include various instructions that perform a particular task or tasks, such as those shown in the appended flowchart. Such a set of instructions for performing a particular task may be characterized as a program, software program, software, engine, module, component, mechanism, or tool. The memory may include random access memory (RAM), ready-only memory (ROM), programmable memory, flash memory, and the like. The memory, include application programs, OS, application data etc. The exemplary user interface device 120 preferably also includes a network module connected to an antenna to communicate with rest of the system 100.

The main server 150 described herein can include one or more computer systems directly connected to one another and/or connected over the network 140. Each computer system includes a processor, non-volatile memory, user input and user output mechanisms, a network interface, and executable program code (software) comprising computer executable instructions stored in non-transitory tangible memory that executes to control the operation of the main server 150. Similarly, the processors functional components formed of one or more modules of program code executing on one or more computers. Various commercially available computer systems and operating system software can be used to implement the hardware and software. The components of each server can be co-located or distributed. In addition, all or portions of the same software and/or hardware can be used to implement two or more of the functional servers (or processors) shown. The main server 150 can run any desired operating system, such as Windows, Mac OS X, Solaris or any other server based operating systems. Other embodiments can include different functional components. In addition, the present invention is not limited to a particular environment or main server 150 configuration. Preferably, the main server 150 is a cloud based computer system. If desired for the particular application, the server 150 or portions of the server 150 can be incorporated within one or more of the other devices of the system 100, including but not limited to a user interface device 120, video device 110, and/or transponder 112.

The main server 150 includes at least one web server and the query processing unit. The web server receives the user query and sends it to the query processing unit. The query processing unit processes the user query and responds back to the user interface device 120 via the web server. The query processing unit fetches data from the database server if additional information is needed for processing the user query. The database is stored in the non-volatile memory. The term "database" includes a single database and a plurality of separate databases. The main server 150 can comprise the non-volatile memory or the main server 150 can be in communication with the non-volatile memory storing the database. The database can be stored at different locations.

Software program modules and data stored in the non-volatile memory the main server 150 may be arranged in logical collections of related information on a plurality of computer systems having associated non-volatile memories. The software and data may be stored using any data structures known in the art including files, arrays, linked lists, relational database tables and the like. The server 150 is programmed to perform the processes described herein.

The video device 110 for providing a video feed of the event can be any desired video camera having the capability to stream live video over the internet to the main server 150. The video device 110 can also be configured to capture sound using a microphone and transmit the sound to the server 150. Thus, the video device 110 comprises a camera and an internet connection, and optionally a microphone. The internet connected can be direct, indirect, wired or wireless. Examples of suitable video devices 110 include but are not limited to, smartphones having a video camera and microphone, tablets having a camera and microphone, watches having a camera, dedicated camera systems, camcorders, and drones having a camera. If desired, a user interface 120 can be used as a video device 110 and provide a live video stream to the server 150, and if selected by the server 150 that live video stream can be broadcast to other user interface devices 120. Examples of video devices 110 connected to the server 150 are shown in FIGS. 1 and 2 as follows: C2—Camera mounted on tripod that follows and tracks participants; A2—Audio assigned to C2; C4—Camera; A4—Audio assigned to C4; A6—Audio assigned to C6; C8—Camera; C10—Camera (built into device such as helmet or clothing); A10—Audio assigned to C10 (built into device such as helmet or clothing); C12—Cameras located on drones following participants with sensors or flow by drone; C14—Camera attached to device or participant—any vendor camera; C16—Camera attached to device or participant—any vendor camera; C18—Camera; and C20—Camera.

The transponder 112 can be connected to a person, animal or device. The transponder 112 measures a variable property of the person, animal or device that changes during the event and transmits the measurements to the server 150. Preferably, the measurements are transmitted in real time. However, batch transmission or intermittent transmission of the measurements can be utilized by the system 100. The server 150 utilizes the measurements to determine which live video feed to broadcast to the user interface device 120. Examples of transponders 112 connected to the server 150 shown in the FIGS. are Sp4—Sensor and data streams assigned to Participants; Sc2—Sensor streams assigned to Cameras C2 and C4; Sc10—Sensor streams assigned to designated Cameras (could be built into device such as helmet or clothing); Sp10—Sensor and data streams assigned to Participants (could be built into device such as helmet or clothing); Sp14—Sensor and data streams assigned to Participants; Sc14—Sensor streams assigned to Camera C26 and sending data direct to stream; and Sp16—Sensor and data streams assigned to Participants. Data from transponders specifically from individuals is shown as Pd2—Data assigned to Participants, Pd6—Data assigned to Participants, Pd14—Data assigned to Participants, and the data can be modified and analyzed as desired.

Examples of transponders 112 include but are not limited to fitness monitors, personal activity trackers, smart cloths that measure vital signs, global positioning (GPS) tracking devices, radio frequency identification (RFID), chip tracking devices, Near Field communication (NFC), altimeters, depth gauges, accelerometers, temperature measuring devices, heart rate monitors, and other sensors, transmitters and 3D motion sensor devices. Such transponders 112 are well-known and any suitable transponder 112 can be used in the present invention.

In an alternative embodiment, the measurements can be generated by the server 150 by analyzing the pixels in the live video streams. The invention can be practiced using measurements from the transponder(s). 112 solely, from computer generation of the measurements using pixels solely, or a combination of measurements from the transponder(s) 112 and computer generated measurements using pixels.

Examples of the variable property to be measured during the event include but are not limited to location, elevation, speed, change of position, acceleration, vital signs, heart rate, blood pressure, oxygen blood level, blood sugar level, temperature, lactic acid concentration, and/or any other desired variable property of a person or animal participating in the event, or a device (such as, but not limited to, a ball, bike, car, motorcycle, plane, helicopter, or drone) associated with the event.

The server 150 is programmed with an algorithm to select the live video stream to broadcast based on the measurement. The algorithm can also take into account user supplied preferences, such as a person, location, animal, device, or any other preference, in selecting the live video feed to broadcast. Any suitable algorithm can be utilized. An example of a suitable algorithm is shown below. The term broadcast includes all methods of transmitting the server selected live video feed from the server 150 to a user interface device 120, including but not limited to radio waves, internet, telephone network, wired, wireless, and streaming.

An app can be downloaded from the server 150 and run on the user interface device 120 for interfacing with the server 150. The user can upload via the user interface 120 personal information and preferences to the server 150. The information can include user name, address, nationality, favorite team, billing information, and any other desired information. The user information can be stored in the server non-volatile memory.

Other desired medium can be broadcast along with the live video feed to the user interface 120, including advertising, text messages, a video box, commentary, live sound, or any other desired medium.

The user can select one or more variable properties to be measured by entering the selection in the user interface device 120. If the user does not select a variable property to be measured, the server 150 can provide a default selection of the variable property. If desired, a player to be followed can be selected using the user interface device 120.

In an embodiment, the user camera "control" and selection, individual additional streaming channels for available cameras within the integrated system can be selected and controlled by individual users viewing the feeds. Thus allowing users to adjust, but not limited to, specific camera angles and distance to view, either as an alternative to the main video stream, or to control the main feed.

The system and process can be provided as a complete "event in a box" that includes all necessary cameras, tripods, tracking devices, server integration and web site components, or can be modularized to incorporate existing devices including a mesh of mobile phones and specific cameras and recording devices.

Exemplary Algorithm for Determining the Broadcast Based on the Measurements

Where a video, audio or data stream is not available the default value is set to zero and the base algorithm logic still applies The approach applies for a combination of wired and wifi enabled streams routed either to a central local data analysis point (computer server) or to a cloud based data analysis point (computer server), or a combination of these.

The sequence of bringing devices online as well as executing the "if-then" analysis steps can be re-sequenced in a different order and the algorithm is still valid—This includes re-sequencing based on alternate prioritization criteria Criteria for switching between camera displays can be determined by static settings, sensor and transmitter data and/or digital pixel changes in the video stream Individual streams of Video, Audio and sensor/Transponder Data can be streamed to their own url feed, creating a multi-channel stream and user ability and control to switch between feeds Inputs:
- Video streams Cameras=C1, C2, C3 . . . Cn
- Video streams Settings: Priority Level=P1, P2, P3 . . . Pn for each C1, C2, C3 . . . Cn
  - Maximum display time=T1, T2, T3 . . . Tn for each C1, C2, C3 . . . Cn
- Audio streams assigned to Cameras=Ac1, Ac2, Ac3 . . . Acn
  - Audio streams Settings: Priority Level=P1, P2, P3 . . . Pn for each Ac1, Ac2, Ac3 . . . Acn
  - Maximum override time=T1, T2, T3 . . . Tn for each C1, C2, C3 . . . Cn
- Primary Audio stream assigned to event=A1, A2, A3 . . . An
  - Audio streams Settings: Priority Level=P1, P2, P3 . . . Pn for each A1, A2, A3 . . . An
- Sensor streams assigned to Cameras=Sc1, Sc2, Sc3 . . . Scn
  - Sensor streams Settings: Priority Level=P1, P2, P3 . . . Pn for each Sc1, Sc2, Sc3 . . . Scn
- Sensor and data streams assigned to Participants=Sp1, Sp2, Sp3 . . . Spn
  - Sensor streams Settings: Priority Level=P1, P2, P3 . . . Pn for each Sp1, Sp2, Sp3 . . . Spn
- Data assigned to Participants=Pd1, Pd2, Pd3 . . . Pdn
- Data stream Settings: Priority Level=P1, P2, P3 . . . Pn for each Pd1, Pd2, Pd3 . . . Pdn Process:
Set initial stream tracks:
Video stream Camera (C) with Priority Level=P1
If Primary event Audio stream available stream Audio (A) with Priority Level=P1
If Camera Audio stream available stream Audio (Ac) with Priority Level=P1
If Participant data (Pd) is available bring online and display based on Priority Level settings
All base levels set to zero
If Sensor and data streams assigned to Participants (Sp) is available bring online, assign Camera (C) preferences to sensor data ranges and begin tracking Start streaming process
Stream Participant sensor data for display
If Sensor stream, Camera action (data and pixel thresholds) or audio fluctuation, assigned to Camera (Sc) meets predefined criteria (P) then switch main stream to display from that Camera (C)
If Camera Audio stream available for that Camera (C) then stream Audio (Ac) from that Camera (C)
If Sensor and data streams assigned to Participants (Sp) has higher preference level (P) then switch to assign Camera (C)
If Camera Audio stream available for that Camera (C) then stream Audio (Ac) from that Camera (C)
If Maximum display time (T) for the assigned Camera (C) has been reached revert to the next highest priority Camera (C)
If Maximum override time (T) for the assigned Camera Audio stream (Ac) has been reached revert to the next highest priority Camera Audio stream (Ac)
Iterate through streaming process for extent of the event Example 1

At many pro or semi pro tennis competitions the main courts have live TV broadcasts and web streaming, but many of the games on the outlying courts are not available to viewers. The present system 100 addresses that and can also be utilized for individuals to share their social games of tennis with friends and family via the internet.

Figure 4A:
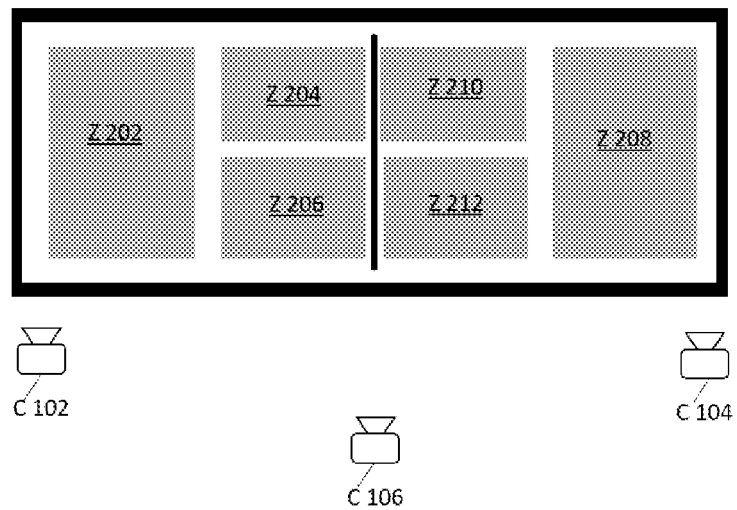
FIGS. 4A-B illustrate examples of a tennis match event being filmed and automatically broadcast using the present invention.

As shown in FIG. 4A, one of two cameras (C202 and C204) is placed on a tripod focused on each side of the court to provide a side view of players either serving or receiving serve. A third camera (C206) is placed on top of a raised point in line with the net with a zoomed out view to give game perspective. Each player wears an RFID tag that is compatible with the existing line (ball in ball out) sensors on the court. An "administrator" sets up and starts the system 100. As players position themselves in specific parts of the court (Zones Z202, Z204, Z206, Z208, Z210, Z212) during play—the server 150 algorithm(s) define which camera is selected as the broadcast video feed. If there is a commentator assigned to the game, they can initiate "predefined sequence patterns"—for example "service sequence 1" will result in Camera C202 focused on the close up view of the server for 30 seconds, 5 seconds of zoomed out view from camera C206, 5 seconds from Camera C204 and then revert to zoomed out view from Camera C206.

Example 2

Figure 4B:
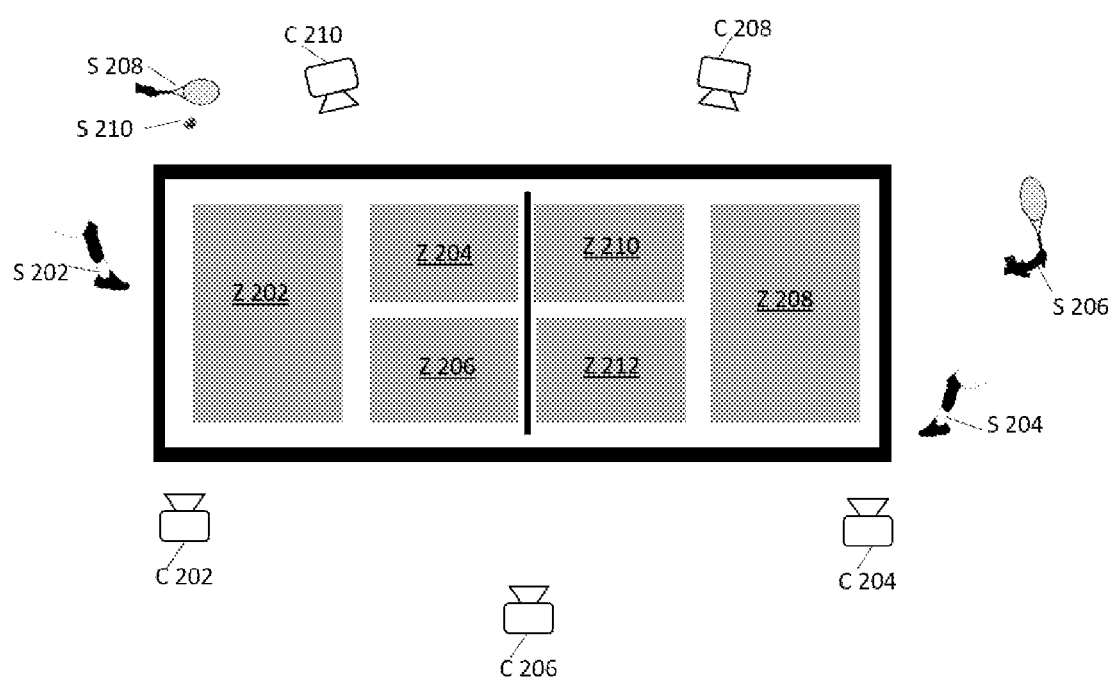

As shown in FIG. 4B, multiple cameras (C202, C204, C206, C208, C210 etc.) are placed in various positions around the tennis court to provide a range of views of players on court. Each player wears an associated sensor tag (S202, S204, S206, S208) that transmit player location and physical status data such as heartrate, blood glucose levels, reaction time, pupil dilation, as well as included in equipment such as players racket and strings and also compatible with the existing line (ball in ball out) sensors on the court. Tennis balls can also be equipped with light weight sensors and coatings, S210. An "administrator" sets up and starts the system 100. As players position themselves in specific parts of the court (Zones Z202, Z204, Z206, Z208, Z210, Z212) during play, the computer algorithms decide which camera is selected as the live broadcast video feed. Dynamic analysis of pixel changes in digital video streams can determine real-time movement of players on the court and trigger camera switching sequence based on the defined prioritization algorithms. If there is a commentator assigned to the game, they can initiate override "predefined sequence patterns," For example, "Player with sensor S202 is querying a call" which will result in Cameras C206, C208 or C210 focused on the view of the player until players and then revert to regular play.

Example 3

Many organized running events (e.g. 5k, 10K, half marathon and marathon) and various distance Triathlon events already provide individual time chip tracking and live tracking of individual athletes progress in the event. The "Event in a Box" provides organizers an option to use predefined equipment at specific locations on the course, although the system 100 is open and allows for addition and customization of the configuration of cameras, and tracking equipment.

Figure 5A:
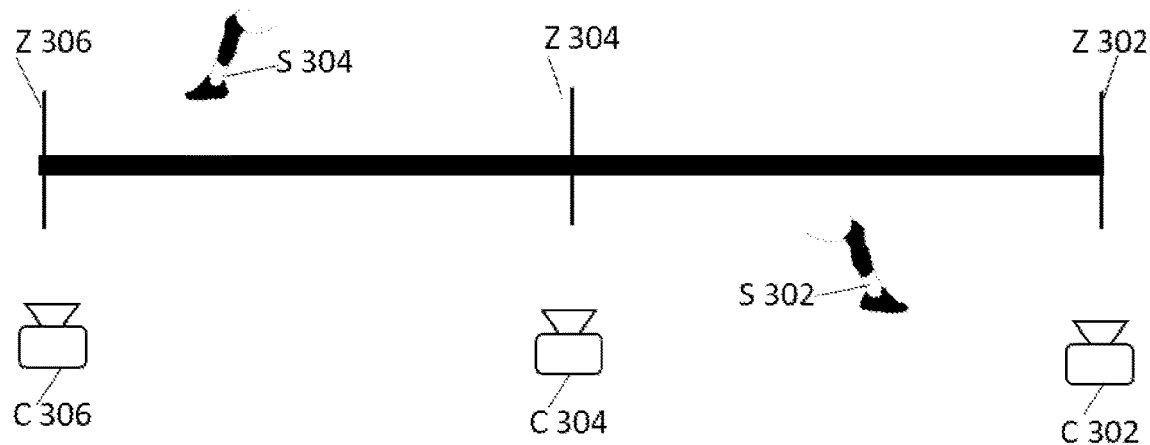
FIGS. 5A-B illustrate examples of a running event being filmed and automatically broadcast using the present invention.

As shown in FIG. 5A, in a 5K run a camera (C302) can be placed at the Start/Finish line (Z302), the midpoint water station (C304 at Z304) and the turnaround point (C306 at Z306). As participants move along the course their progress is tracked with a timing chip (S303, S304). The event overall will provide a primary stream which includes sequenced switching between cameras (C302, C304, C306) along the course based on the overall stages of the race. If there is a commentator assigned to the event, their commentary can be overlaid on the primary stream, they can initiate "predefined sequence patterns." For example, "Race winner is entering the finish chute" can result in Camera C302 focused on the close up view of the winner for 45 seconds, 5 seconds of zoomed out view, 5 seconds each of participants still on the course from Camera C304 and C306 and then revert to zoomed out view from Camera C302.

Example 4

Figure 5B:
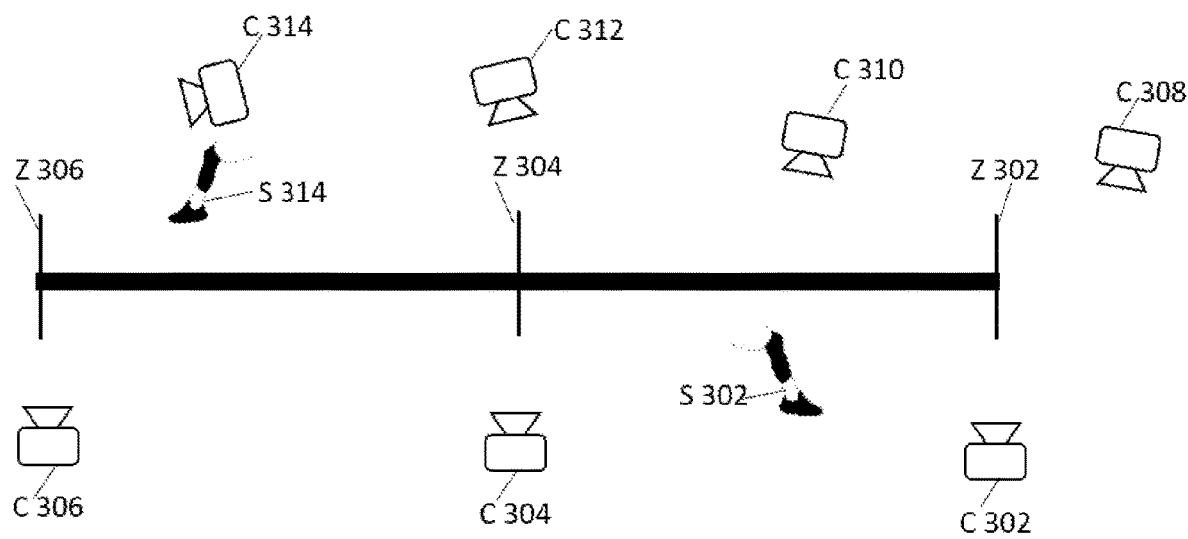

As shown in FIG. 5B, in a 5K run a camera (C302) can be placed at the Start/Finish line (Z302), the midpoint water station (C304 at Z304) and the turnaround point (C306 at Z306). As participants move along the course their progress is tracked with a timing chip (S303, S314) and any sensors that may be on their person or embedded in their clothing or equipment (S306) transmit location and physical status data such as heartrate, blood glucose, lactic acid and VO2 levels. The event overall can provide a primary stream which includes sequenced switching between cameras (C302, C304, C306) along the course based on the overall stages of the race. If there is a commentator assigned to the event their commentary can be overlaid on the primary stream and they can initiate "predefined sequence patterns." For example "Race winner is entering the finish chute" can result in Camera C302 being focused on the close up view of the winner for 45 seconds, 5 seconds of zoomed out view, 5 seconds each of participants still on the course from Camera C304 and C306 and then revert to zoomed out view from Camera C302.

As a runner approaches a particular point in the event, e.g. turn around zone Z306, any online viewer that is subscribed to watch that particular participant's progress (rather than the overall primary event video stream) can see the video and audio feed switched to that of Camera C306, they will be able to view overlays of the individual participants data stats as they are transmitted (S314) and if the participant has a camera on their body (C314) they will be able to view live video from that camera integrated into the participant video stream based on defined algorithm selection criteria.

Spectators along the course can connect their user interface device 120, smartphone, mobile or other streaming cameras (e.g. C312, C310) into the event "mesh" and either assign themselves to a particular participant or the event as a whole. The server 150 camera switching algorithms will then incorporate these camera feeds into the broadcast video stream and any individual's video stream based on their proximity to the camera location.

Example 5

Many "extreme" sports such as kiteboarding, snowboarding, downhill mountain biking and wingsuit flying are at the forefront of multiple camera angles and placements including body camera, camera mounts and drone views. Events in these activities can range from an organized competition, to a specific planned stunt or attempt at a particular milestone or trick as well as practicing and performing the activity or sport in a regular local or new remote location (first ridden, first attempt, never done before). This system 100 allows for real time live streaming of the event without the need for a dedicated camera and production crew.

Figure 6A:
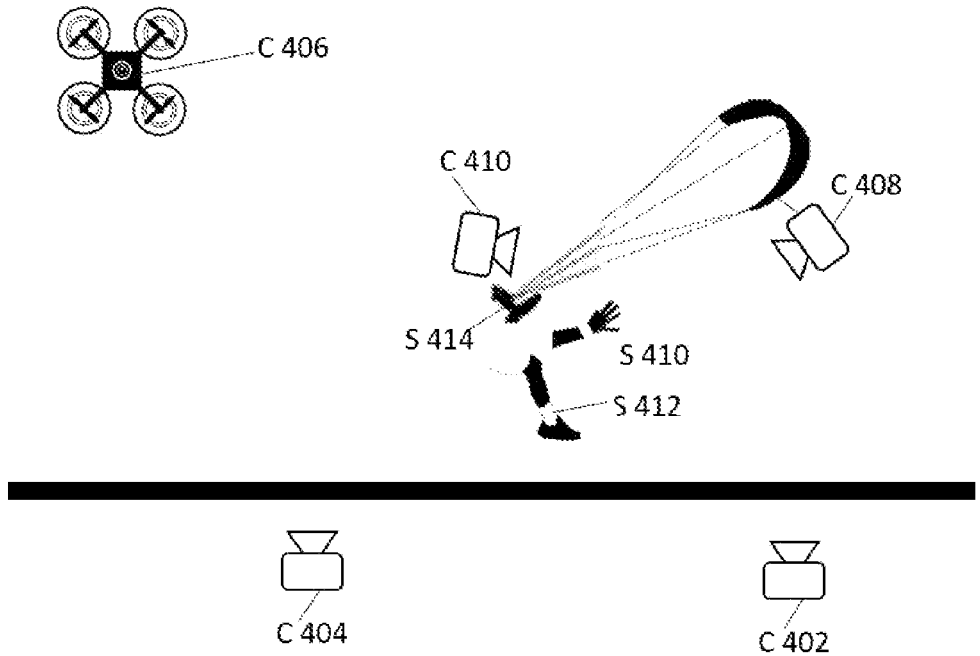
FIGS. 6A-B illustrate examples of extreme events being filmed and automatically broadcast using the present invention.

As shown in FIG. 6A, an individual participant can set up a stationary camera (C402) on the beach and a camera (C404) with a tracking/"follow-me" sensor (S412) attached to their body. The participant has a transponder sensor (S410) which records motion items such as location, altitude and speed and a camera (C410) on their person. A Camera (C408) is attached to the kite equipment. A Camera (C406) can be placed on a mobile device such as a drone and can utilize an on-person sensor (S414 or S412) to follow the individual participant as predetermined distance, height and speed. Based on proximity specific triggers such as speed height, altitude, changes in speed or any other variable, the switching algorithms will initiate changes in which camera is providing the primary video stream and what data and stats are overlaid and integrated into the primary stream.

Example 6

Figure 6B:
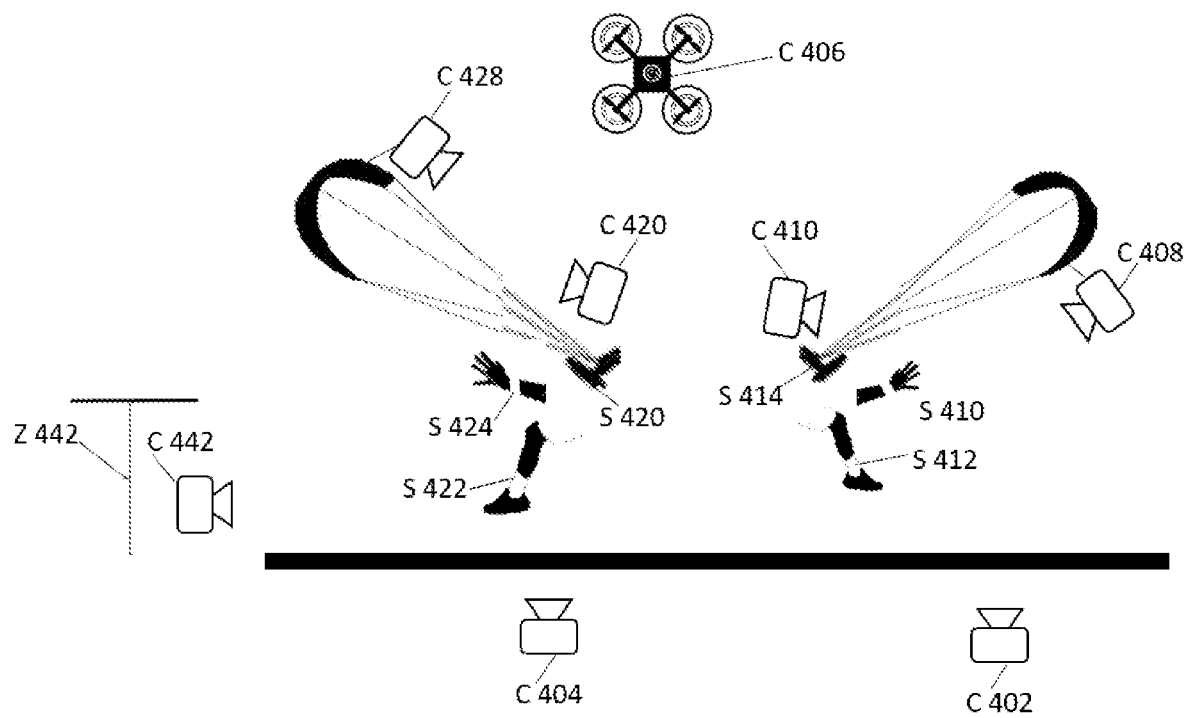

As shown in FIG. 6B, at a Kiteboarding event an administrator can set up a stationary camera (C402) on the beach and a camera (C404) with a tracking/"follow-me" sensor (S412 S422) attached to participants bodies. The participants have transponder sensors (S410 and S420) which record motion items such as location, altitude and speed and a cameras (C410 and C420) on their person. A Camera (C408 and C428) can be attached to the kite equipment. A specific zone (Z442) is designated for Camera C442 viewing. A Camera (C406) can be placed on a mobile device such as a drone and can utilize an on-person sensor (S414, S424, S412 or S422) to follow the individual participant as predetermined distance, height and speed. Based on proximity specific triggers such as speed height, altitude, changes in speed or any other variable, the switching algorithms will initiate changes in which camera is providing the primary video stream and what data and stats are overlaid and integrated into the primary stream.

Example 7

This basic structure shown in this example can provide a base platform for any court based "ball" sports including but not limited to, soccer, football, basketball, volleyball to baseball and hockey and cricket. Some of these sports have rules in place currently about objects on players and in the ball, while other sports already have tracking devices etc. for those that do not they may take time for individual governing bodies to approve changes that can provide a complete solution but the version one solution will suffice until that is in place.

Figure 7A:
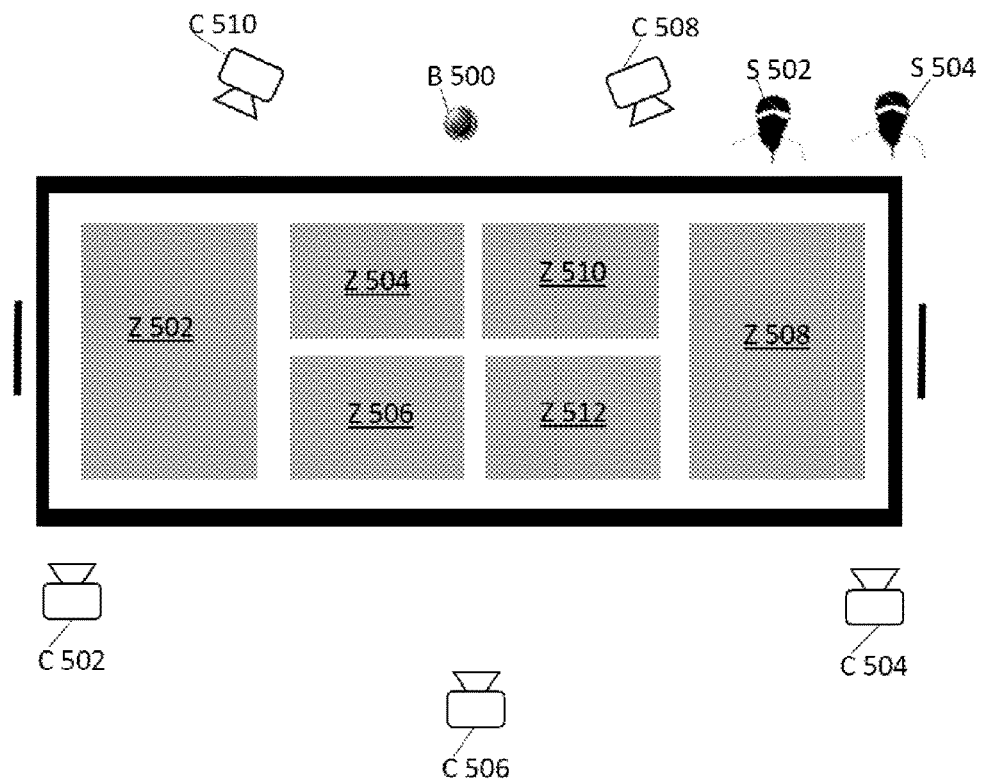
FIGS. 7A-C illustrate examples of ball based sporting events being filmed and automatically broadcast using the present invention.

As shown in the water polo example of FIG. 7A, one of two cameras (C502 and C504) can be placed on a tripod focused on each side of the court to provide a side view of players either serving or receiving serve. A third camera (C506) can be placed on top of a raised point in line with the center of the pool with a zoomed out view to give game perspective. Two cameras (C510 and C508) can be placed underwater on each side of the pool to provide a view of players movement. Each player is issued with an approved RFID tag that is placed in their water polo cap (S502,S504). The ball can include a tracking chip (B500).

An "administrator" sets up and starts the system 100. As players position themselves in specific parts of the pool (Zones Z502, Z504, Z506, Z508, Z510, Z512) during play or the ball travels into different zones, the server 150 algorithms will define which camera is selected as the live broadcast video feed. If there is a commentator assigned to the game, they can initiate "predefined sequence patterns." For example "Corner at Goal 1" can result in Camera C502 being focused on the close up view of the goal for 30 seconds, 5 seconds of zoomed out view from camera C510, 5 seconds from Camera C506 and then revert to zoomed out view from Camera C502. Specific triggers can also be set so for example if more than two players from opposing teams are closely congregated in a zone (e.g. Z512) of the pool while the rest of the players and the ball are in a different zone (e.g. Z502) there is an indication that an altercation may be occurring off the ball and a sequence alternating between underwater camera C508 and zoomed out cameras C506 and C504 can initiate.

Example 8

Figure 7B:
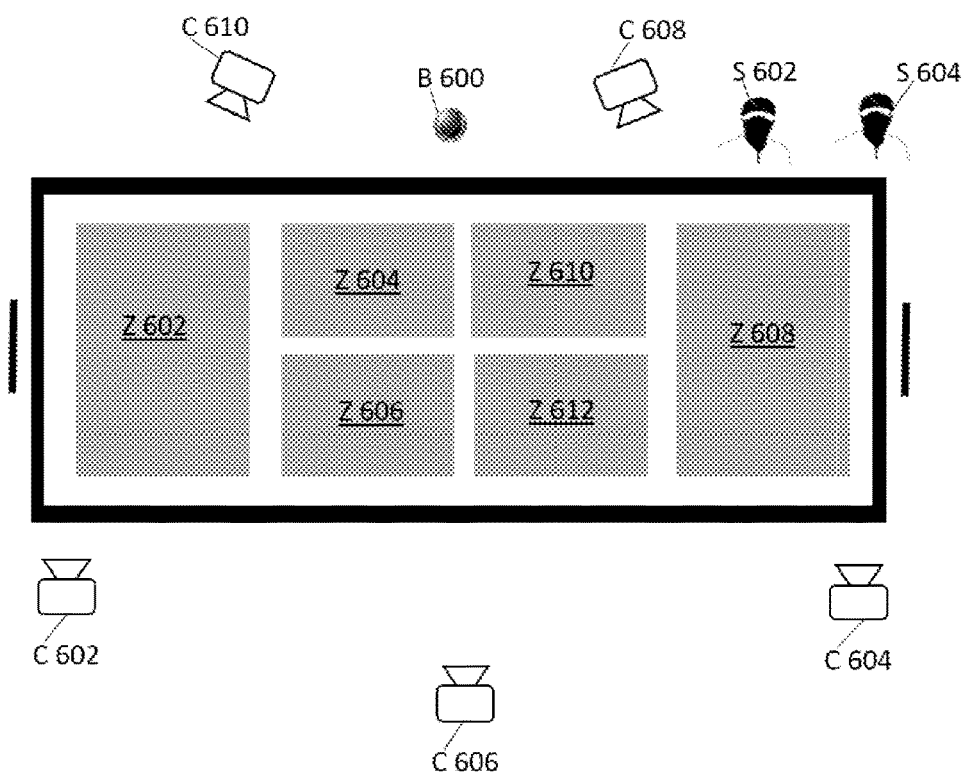

As shown in the children soccer game example of FIG. 7B, one of two cameras (C602 and C604) can be placed on a tripod focused on each side of the field to provide a side view of play. A third camera (C606) can be placed on top of a raised point in line with the center of the field with a zoomed out view to give game perspective.

Two cameras (C610 and C608) can placed on motion based tripods aimed at tracking players within range that are wearing transponders (S602 and S604) to provide a view of players movement. The ball can include a tracking chip (B600).

An "administrator" sets up and starts the system 100. As the ball moves into specific parts of the field (Zones Z602, Z604, Z606, Z608, Z610, Z612) during play, the server 150 algorithms can define which camera is selected as the live broadcast video feed.

As an alternative to watching the broadcast video feed, friends and relatives of the child wearing a sensor tag (S602 and S604) can select to view the game exclusively watching that player or based on algorithm select to watch the primary feed integrated with a specific player perspective based on triggers that will generate camera changes when transponders (S602 and S604) are either within a zone (e.g. Z512) or are in close proximity to the ball (B600).

Example 9

Figure 7C:
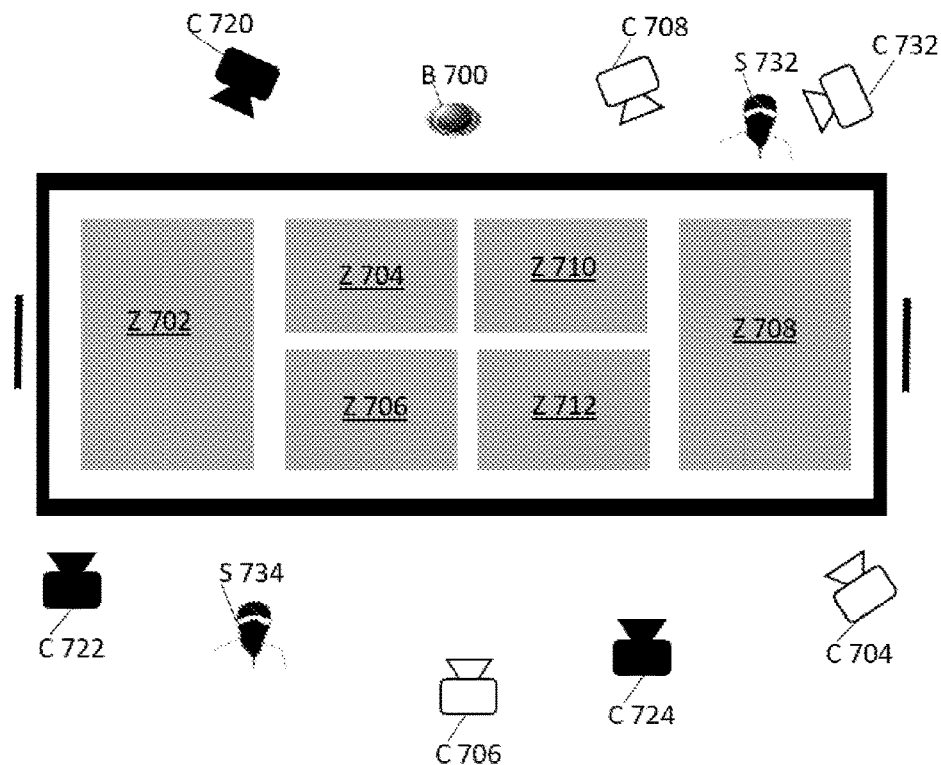

As shown in the pro football game example of FIG. 7C, a professional broadcaster can have multiple production staff onsite to film and produce the event, they can have dedicated cameras (C720, C722, C724) and commentators. The server 150 algorithm triggers can be integrated into the main broadcast providing a number of different automatic views and perspectives. Professional players with sensor tags (S7322, S734) that transmit player location and physical status data such as heartrate, blood glucose levels, reaction time, pupil dilation, as well as included in equipment such as players helmets including embedded helmet cameras (C732) and microphones. The footballs can also be equipped with light weight sensors and/or coatings B700.

An "administrator" sets up and starts the system 100. Viewers can then select whether to watch an alternative view to the main TV broadcast for example watching the play form the perspective of the quarterback (S732) or Wide Receiver (S734) with regular algorithm driven camera changes to incorporate the in helmet camera (C732) perspective or sensor driven triggers. As players position themselves in specific parts of the court (Zones Z702, Z704, Z706, and Z708) during play—the algorithms will define which cameras match specific criteria that can be integrated into the main TV Broadcast feed. Dynamic analysis of pixel changes in digital video streams can determine real-time movement of players on the field and trigger camera switching sequence based on the defined prioritization algorithms.

A TV producer assigned to the game, can initiate "predefined sequence patterns." For example, a touchdown scored in zone Z708 after showing the players celebrating in the regular TV broadcast, video can be dynamically integrated from a selected "mesh" of user interface devices 120, cellphone and individual cameras, that are available in the system 100 from fans that are in the stands (e.g. C704, C706, C708).

As an alternative to watching the main TV broadcast, fans can select to view the game exclusively watching that player or based on the server 150 algorithm to watch the broadcast feed integrated with a specific player perspective based on triggers that will generate camera changes when transponders (S732 or S734) are either within a zone (e.g. Z712) or are in close proximity to the ball (B700).

Example 10

The equipment carried my military personal is continually expanding in terms of functionality, sophistication and communication integration protocols which provide an expanding amount of electronic items that can provide data, sensors and event triggers that can be integrated into the algorithm set.

Figure 8:
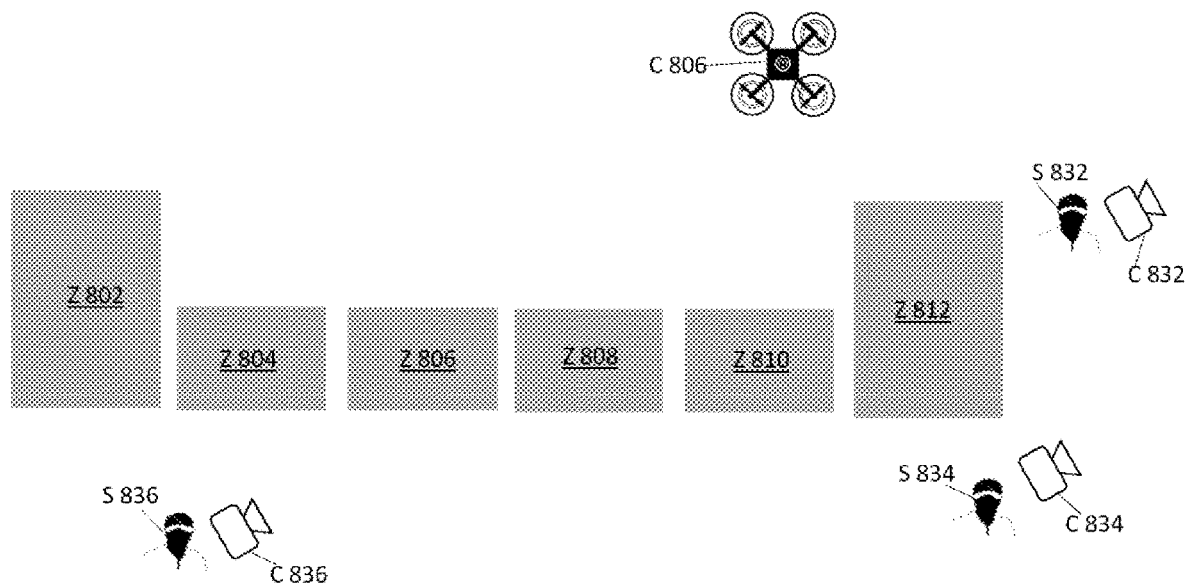
FIG. 8 illustrates an example of military event being filmed and automatically broadcast using the present invention.

As shown in military example of FIG. 8, a detachment of 8 marines are working at clearing and securing a damaged city block, and each soldier is equipped with a helmet camera and sensors and monitoring devises to track heart rate, breathing, VO2, hydration and lactic acid calculations. While the troops are maintaining radio silence there can be a central coordinator monitoring and tracking the operation from a remote location. The coordinator notices three code red triggers around the 3 marines that are positioned on the right flank (e.g. S832, S834 in Zone Z812) based on elevated heart rate and excessive breathing. The server 150 algorithm immediately generates a primary broadcast video stream displaying a split screen with simultaneous helmet camera view from each individual's camera perspective (C832, C834) along with vital signs. Based on a selection of predefined sequences the Coordinator can initiate for example a "move right under attack" and the remaining marines can be given an automated algorithm generated signal including a command to release an additional surveillance drone with Camera C806 to provide additional perspective and guidance of the operation. While the coordinator can manually override the sequences the primary view will be generated by predetermined algorithms that can help to reduce the risk of slip ups and indecision in the heat of the moment.

Example 11

The proliferation of video cameras, cell phone video, personal monitoring and health tracking devices provides a proliferation of data which can be integrated into the algorithm to allow for real time streaming of an integrated subscription video stream without the need for dedicated production. While many pop stars, singers, musicians, movie stars and other celebrities participate in professionally filmed, edited and produces reality shows there is increasing demand for live events with the raw edge of uncertainty that these provide. Even these stars cannot afford around the clock professional production and camera crews following them around. This system 100 provides the ability for any user to establish a live event (of any duration from a few hours for a party, to an ongoing daily, monthly or even annual continuous stream) with multiple cameras and data sources, set the priority and time span parameters for each device and to stream automated algorithm generated production to a live channel.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, steps and/or embodiments, the invention is not intended to be limited to the particulars disclosed herein. Rather, the invention extends to all functionally equivalent structures, processes and uses, such as are within the scope of the appended claims. Those skilled in the art, having the benefit of the teachings of this specification, may affect numerous modifications thereto and changes may be made without departing from the scope and spirit of the invention.

I claim:

1. A process for providing automated live video stream production of an event comprising:
    connecting a plurality of video devices to a cloud-based server via a network, the video devices comprising a camera and transmitter for transmitting live video feeds to the server, the video devices being aimed at different views of the event;
    connecting at least one transponder to a person or animal participating in the event or device being used in the event for live measuring of at least one variable property of the person, animal or device that changes during the event;
    transmitting by the video devices a plurality of the live video feeds of the different views of the event to the server;
    transmitting by the at least one transponder a measurement feed of measurements of the at least one variable property during the event to the server;
    selecting by the server one of the live video feeds based on the measurement of the at least one variable property at a first time;
    connecting by a user a user interface device to the server, the user interface having a display constructed to display video;
    broadcasting by the server a first selected live video feed to the user interface device, the first selected live video feed being selected by the server based on the measurement at the first time;
    the user interface device displaying the first selected live video feed;
    broadcasting by the server a second selected live video feed to the user interface device and stopping broadcasting of the first live video feed, the second selected live video feed being selected by the server based on the measurement at a second time later than the first time, the second selected live feed having a different view of the event than the first selected live feed; and
    the user interface device displaying the second selected live feed.

2. A process for providing automated live video stream production of an event comprising:

connecting a plurality of video devices to a cloud-based server via a network, the video devices comprising a camera and transmitter for transmitting live video feeds to the server, the video devices being aimed to at different views of the event;

transmitting by the video devices a plurality of the live video feeds of the different views of the event to the server;

analyzing pixels of the live feeds by the server to generate measurements of at least one variable property of a person, animal or device that changes during the event;

selecting by the server one of the live video feeds based on a measurement of the at least one variable property at a first time;

connecting by a user a user interface device to the server, the user interface having a display constructed to display video;

broadcasting by the server a first selected live video feed to the user interface device, the first selected live video feed being selected by the server based on the measurement at the first time;

the user interface device displaying the first selected live video feed;

broadcasting by the server a second selected live video feed to the user interface device and stopping broadcasting of the first live video feed, the second selected live video feed being selected by the server based on the measurement at a second time later than the first time, the second selected live feed having a different view of the event than the first selected live feed; and the user interface device displaying the second selected live feed.

3. The process according to claim 1, wherein the server transmits the measurements to the user interface.

4. The process according to claim 1, wherein the at least one variable property to be measured is selected by the user on the user interface device and transmitted to the server.

5. The process according to claim 1, wherein the server randomly selects the at least one variable property to be measured.

6. The process according to claim 1, wherein the event is a sporting event, baseball, soccer, football, tennis, race, bicycling, race cars, motorcycle race, motocross, surfing, skydiving, skiing, waterskiing, boating, golfing, or any other sport, military engagement, concert, show, or reality show.

7. The process according to claim 1, wherein the at least one transponder measures at least one of location, elevation, speed, change of position, acceleration, vital signs, heart rate, blood pressure, oxygen blood level, blood sugar level, temperature, or lactic acid concentration.

8. The process according to claim 1, wherein the at least one transponder comprises at least one of fitness monitors, personal activity trackers, smart cloths that measure vital signs, global positioning (GPS) tracking devices, radio frequency identification (RFID) chip tracking devices, accelerometers, temperature measuring devices, or heart rate monitors.

9. The process according to claim 1, wherein the server analyzes pixel rates as a factor in determining which live video feed to broadcast.

10. The process according to claim 1, wherein at least one of the plurality of video devices is a first user interface device and a live video stream from the first user interface device is broadcast by the server to a second user interface device as the first selected live video feed.

11. The process according to claim 1, wherein plurality of video devices comprises at least one of internet connected televisions and projectors, tablets, iPads, Mac OS computers, Windows computers, e-readers, and smartphones.

12. The process according to claim 1, wherein the user selects a video device to be displayed.

13. A non-transitory computer readable medium storing instructions executable by a computing system in non-volatile memory, wherein execution of the instructions implements a process according to claim 1.

14. A system for automatically producing a live video stream according to the process of claim 1 comprising:
the cloud-based server connected to the internet;
the plurality of the video devices connected to a cloud-based server via a network;
the plurality of the user interface devices connected to the server;
the at least one transponder connected to the person, animal or device; and
a video stream selection software module constructed to select the live video feed to be broadcast based on the measurement.

15. The process according to claim 2, wherein the server transmits the measurements to the user interface.

16. The process according to claim 2, wherein the at least one variable property to be measured is selected by the user on the user interface device and transmitted to the server.

17. The process according to claim 2, wherein the server randomly selects the at least one variable property to be measured.

18. The process according to claim 2, wherein the event is a sporting event, baseball, soccer, football, tennis, race, bicycling, race cars, motorcycle race, motocross, surfing, skydiving, skiing, waterskiing, boating, golfing, or any other sport, military engagement, concert, show, or reality show.

19. The process according to claim 2, wherein the at least one transponder measures at least one of location, elevation, speed, change of position, acceleration, vital signs, heart rate, blood pressure, oxygen blood level, blood sugar level, temperature, or lactic acid concentration.

20. The process according to claim 2, wherein the at least one transponder comprises at least one of fitness monitors, personal activity trackers, smart cloths that measure vital signs, global positioning (GPS) tracking devices, radio frequency identification (RFID) chip tracking devices, accelerometers, temperature measuring devices, or heart rate monitors.

* * * * *